United States Patent [19]

Goloff

[11] 4,304,445

[45] Dec. 8, 1981

[54] STUB SHAFT BEARING

[75] Inventor: Alexander Goloff, East Peoria, Ill.

[73] Assignee: Caterpillar Tractor Co., Peoria, Ill.

[21] Appl. No.: 85,647

[22] PCT Filed: Apr. 27, 1979

[86] PCT No.: PCT/US79/00281

§ 371 Date: Apr. 27, 1979

§ 102(e) Date: Apr. 27, 1979

[87] PCT Pub. No.: WO80/02447

PCT Pub. Date: Nov. 13, 1980

[51] Int. Cl.³ .............................................. F16C 25/00
[52] U.S. Cl. ......................................... 308/64; 308/97
[58] Field of Search ....................... 308/17, 37, 63–65, 308/67, 69–72, 78, 237 A, 238, 240, DIG. 8, 97; 403/39, 243, 370

[56] References Cited
U.S. PATENT DOCUMENTS 2,766,078  10/1956  Roach .................................. 308/63
2,848,283   8/1958  Schroeder ........................... 308/63

*Primary Examiner*—Frederick R. Schmidt
*Attorney, Agent, or Firm*—Phillips, Moore, Weissenberger, Lempio & Majestic

[57] ABSTRACT

Idler gears (14) which transmit power from crankshaft gears (12) to camshaft gears (16) may have helical teeth thus producing a tilting or cocking force on the idler gears (14). Past attempts to solve this problem have led to bulky and expensive structures, or to structures which are subject to failure. The problem is solved herein by a sleeve bushing (38, 54 or 54') having an axially extending bearing surface (42, 58 or 88') and being located between the bore (26,52) of an idler gear (14) or other rotary member and a stub shaft (30 or 56), the sleeve bushing (38,54 or 54') including construction (51 or 60) which maintains an extended area (44,46 or 58,88) of the bearing surface (42 or 58 or 88) in fitted mating relation against an extended area (49, 52 or 97) of a respective one of the shaft (30,56) and the bore (26,52) as the bearing surface (42,58,88') is worn down.

9 Claims, 9 Drawing Figures

U.S. Patent    Dec. 8, 1981    Sheet 1 of 3    4,304,445
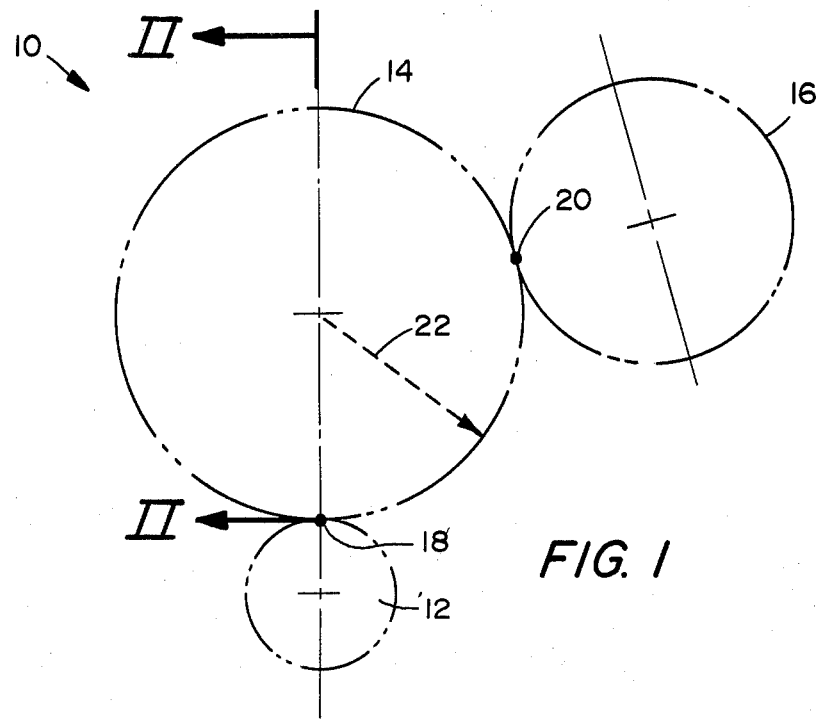
FIG. 1
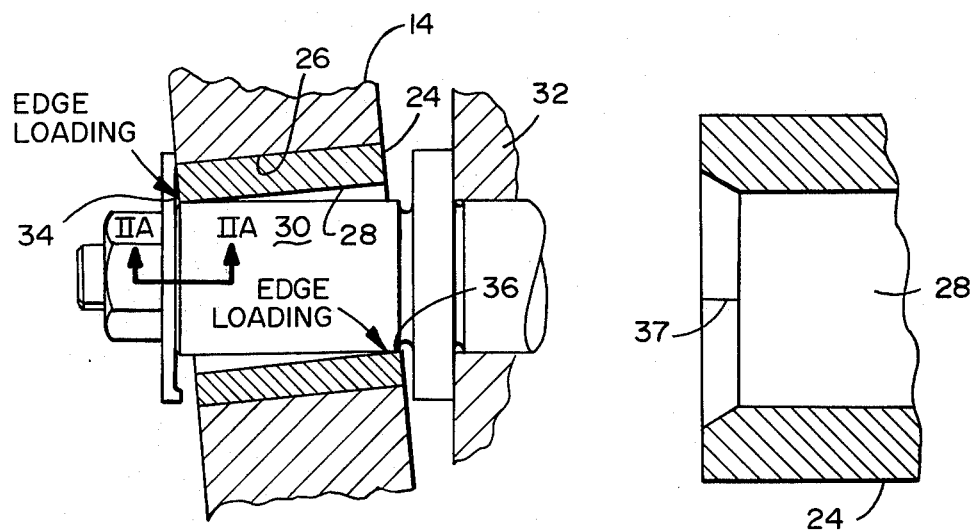
FIG. 2
PRIOR ART
FIG. 2A

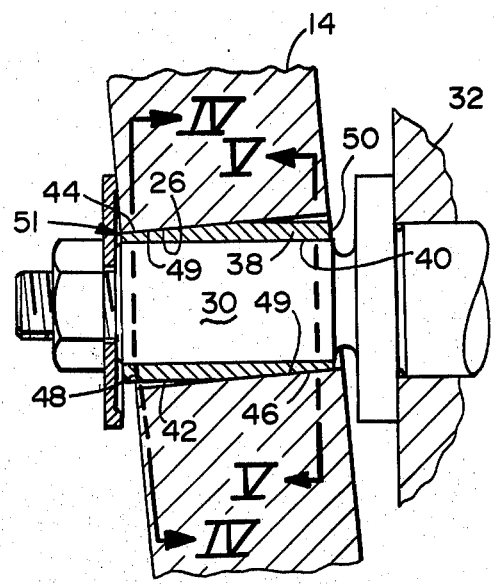
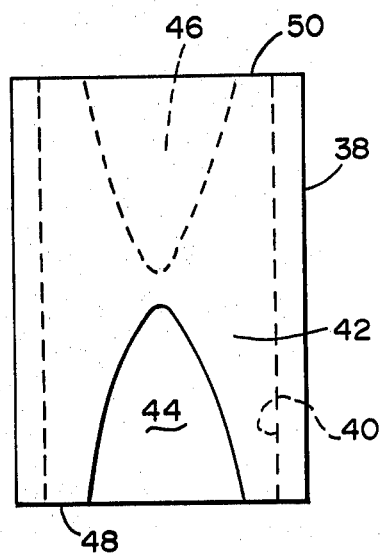
FIG. 3
FIG. 4A
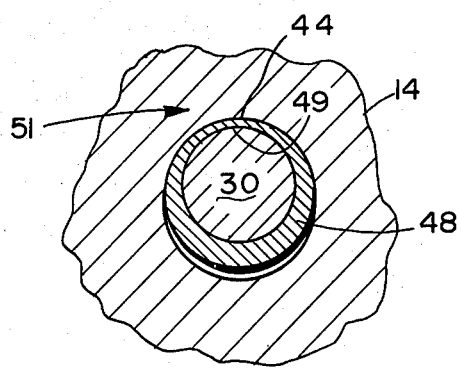
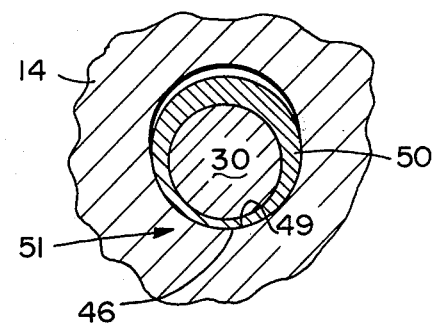
FIG. 4
FIG. 5

STUB SHAFT BEARING

DESCRIPTION

1. Technical Field

The invention relates to an improved bearing structure of the sort that is usable between a bore of a gear, such as an idler gear, and a relatively stationary shaft, such as a stub shaft on which the gear is mounted for rotation.

2. Background Art

Idler gears having helical teeth are commonly used to transmit power from a crankshaft gear to a camshaft gear of an internal combustion engine. Normally, bushings are press fit into the bores of the idler gears. These bushings turn on fixed stub shafts which are secured in some manner, such as by press fits, to the front or rear of engine blocks. If a crankshaft gear contacts the idler gear at one point on the circumference thereof, and the camshaft gear contacts the idler gear at a different point on the circumference thereof as is normally the case, then a couple is created which would tend to rotate the idler gear about an axis on the perpendicular bisector of a line drawn between the points of contact of the crankshaft gear and the camshaft gear with the idler gear, which line is generally in the plane of the idler gear.

As a result of the above discussed couple there is a force acting on the idler gear which causes it to cock out of a common plane defined by the crankshaft gear, the idler gear and the camshaft gear. This produces loading on the outer edges of the idler gear at each end of the bore formed therethrough. Accordingly, the idler bushing which serves as a bearing surface for contacting the stub shaft is cocked and edge loading of the bearing, which is in the nature of a sleeve bearing, occurs. This drastically reduces the load carrying capacity and increases the wear rate of the sleeve bearing. The ends of the bore of the bearing becomes internally chamfered to form what is commonly referred to as a "bell-mouth" at either end thereof. The load carrying capacity becomes particularly low when the bearing is worn, because of the large clearance (commonly known as the "clearance ratio", expressed as the radial clearance divided by the radius of the sleeve bearing). With such a large clearance, and adequate oil film is not maintained between the bearing and the shaft, thus leading to faster wear.

In an attempt to significantly reduce the wear rates of idler gear assemblies, the idler gears are sometimes mounted on tapered roller bearings or are straddle mounted on relatively widely spaced sleeve bearings with one sleeve bearing mounted in one side of the gear and another in the opposite side. The tapered roller bearings have a disadvantage in that they are relatively bulky and have a relatively short service life since rolling element bearings are subject to pitting type (fatigue) failures if their size is not large enough and are too bulky radially if they are large enough to avoid the fatigue problem. Other roller element type of bearings than tapered roller bearings suffer from the same disadvantages. The straddle mounting, on the other hand, is effective in resisting the cocking action, but is bulky in the axial direction. This can be a serious problem since it is normally desirable to keep the engine length as short as possible so as to provide access to other components, allow reduction in the overall length of the machine in which the engine is being used, etc. Also, such straddle mountings are relatively expensive to produce, install and service.

It should also be noted that when idler gears become cocked too much, the teeth thereof can become misaligned with the teeth of the crankshaft gear and the camshaft gear. This represents yet another severe problem with prior art idler gears.

Disclosure of Invention

The present invention is directed to overcoming one or more of the problems as set forth above.

In one aspect of the present invention, an improvement is provided in a bearing arrangement wherein a rotary member is rotatably mounted at a bore therein on a relatively stationary shaft and the rotary member is biased to tilt about an axis perpendicular to the shaft. The improvement comprises a sleeve bushing having an axially extending bearing surface and being located between the bore and the shaft, the sleeve bushing having means for maintaining an extended area of the bearing surface in fitted relation against a mating extended area of a respective one of the shaft and the bore as the bearing surface is worn down.

The problem of maintaining a high load carrying capacity on idler gears, even after long use of the gears, and maintaining the teeth of the gears in at least reasonably proper alignment for extended periods of time with other gears, such as camshaft gears and crankshaft gears, is solved herein. This problem is solved by using a sleeve bearing having an extended area bearing surface, which is maintained in fitted mating relation against an extended area of the bore of the idler gear or the stub shaft on which the idler gear mounts as the bearing surface is worn down. An adequate oil film can then be maintained between the two extended areas and the wear rate is thereby significantly reduced. In one embodiment, this reduced wear rate leads to significantly longer use times before damaging gear misalignment can occur. In another embodiment of the present invention, cocking of the idler gear is substantially eliminated whereby proper gear alignment is continuously assured. And, all of this is accomplished in a relatively inexpensive manner and without significantly adding to the length or radial dimension of the stub shaft or stub shaft-idler gear combination.

BRIEF DESCRIPTION OF DRAWINGS

FIG. 1 illustrates, schematically, a typical timing gear train;

FIG. 2 illustrates, in partial view in side section, the prior art mounting of an idler gear on a stub shaft;

FIG. 2A illustrates, in partial view taken along the line IIA—IIA of FIG. 2, a partially worn prior art bearing;

FIG. 3 illustrates one embodiment of the present invention, in a view similar to FIG. 2;

FIG. 4 illustrates a view taken along the line IV—IV of FIG. 3;

FIG. 4A illustrates a partial top view of a bearing as shown in FIGS. 3 and 4;

FIG. 5 illustrates a view taken along the line V—V of FIG. 3;

BEST MODE FOR CARRYING OUT THE INVENTION

Figure 6:
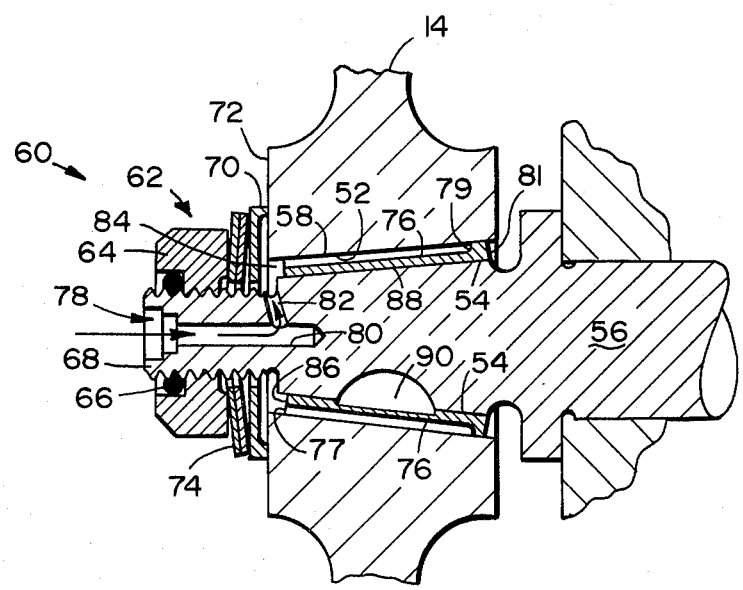
FIG. 6 illustrates, in a view similar to FIG. 2; another embodiment in accordance with the present invention.

While the present invention will be described in relationship to its usefulness with an idler gear, it should be noted that the invention is useful in any bearing arrangement wherein a rotary member is rotatably mounted on a stationary shaft. Thus, the following description is not meant in any way to be limiting and is given in terms of the aforementioned idler gear arrangement since it was invented for such a system originally and since it is believed that such a discussion will be clearer to the reader.

Adverting to FIG. 1, there is illustrated a typical timing gear train 10. The timing gear train 10 includes a crankshaft-driven gear 12 which transmits power to an idler gear 14 which in turn transmits power to a camshaft-driving gear 16. The crankshaft-driven gear 12 and idler gear 14 are in contact with one another at a point 18. The camshaft-driving gear 16 and the idler gear 14 contact one another at a point 20 which is spaced circumferentially from the point 18. The idler gear 14 is of the conventional helical toothed design whereby forces are created in different directions at the points 18 and 20; for example, the force at the point 18 might be up and out of the drawing towards the reader while the force at the point 20 would of necessity be down and into the paper, away from the reader. This creates a couple about a line 22 which is the perpendicular bisector of a line which may be drawn connecting the points 18 and 20.

Adverting now to FIG. 2, it will be seen that the results of the aforementioned couple is to provide a tilting or cocking force upon the idler gear 14. It will be noted that the prior art design shown in FIG. 2 includes a sleeve bearing 24 of a cylindrical tubular shape which is attached to a bore 26 in the idler gear 14 and which has a bearing surface 28 which bears upon a shaft 30, generally a relatively stationary stub shaft which is fixed to an engine block 32. It will be apparent that the line 22 is perpendicular to the shaft 30, and thus, the couple is created about an axis (line 22) which is perpendicular to the shaft 30. As a result of the aforementioned couple, the edges 34 and 36 of the sleeve bushing 24 receives substantially all of the load upon the idler gear 14. This phenomenon is known as "edge loading". The result of this edge loading is that the idler gear 14 has only a low load carrying capacity when in its cocked state since the load falls on a thin line contact zone 37 (FIG. 2A), rather than on extended area mating surfaces. Not only is load carrying capacity low, but also, as wear occurs, an adequate oil film cannot be maintained on thin line contact zone 37, and wear is thus accelerated. Because of this acceleration in wear rate, the cocking rate is likewise accelerated and the gears more quickly become misaligned.

EMBODIMENT OF FIGS. 3, 4, 4A AND 5

Adverting to FIGS. 3, 4, 4A and 5, there is illustrated therein one embodiment of the present invention which solves the aforementioned edge loading problem. In the embodiment of FIGS. 3, 4, 4A and 5, a sleeve bushing 38 is attached, e.g., by a shrink fit, at an in-facing surface 40 thereof, to the shaft 30. The idler gear 14 is slipped over the sleeve bushing 38 and is in rotating relation relative thereto. The wear (bearing) surface, then, is an outer surface 42 of the sleeve bushing 38. Originally, the sleeve bushing 38 can be of a tubular cylindrical shape. The sleeve bushing 38 must, however, be of an easier wearing (generally softer) material than the gear 14. If these requirements are followed, as the idler gear 14 becomes cocked during use, the sleeve bushing 38 will wear unevenly to form a first extended bearing area 44 and a second extended bearing area 46, one adjacent each of the ends, 48 and 50, of the sleeve bushing 38. It is, even possible, although less desirable, to preform the extended bearing areas 44 and 46 to assure an extended (and easily lubricated) contact zone on initial installation. If preformed, the stable amount of cocking may be exaggerated over what would occur with normal wear.

It is clear that the overall wear on the sleeve bushing 38 will then be relatively uneven but that an extended area 44 and 46 of the bearing surface 42, will be maintained in fitted mating relation against an extended area 49 of the bore 26 of the idler gear 14, as the bearing surface 42 is worn down. Thus, the attaching of the sleeve bushing 38 to the shaft 30 and the requirement that the sleeve bushing 38 be of an easier to wear (softer) material than the gear 14, serve as means 51 for maintaining the fitting mating relation between the extended areas 44 and 46 of the bearing surface 42 and the extended area 49 of the bore 26. And, due to this mating relation and its stability or maintenance during service life, an adequate oil film is maintained in the small (mating) clearance between the extended area 49 of the bore 26 and the extended bearing areas 44 and 46 of the bearing surface 42. This leads to a much reduced wear rate, which in turn leads to the gears staying in alignment for a longer period of time. FIGS. 4 and 4A illustrate the wearing down at 44 of the sleeve bushing 38. Similarly, FIGS. 4A and 5 illustrate the wearing down at 46 of the sleeve bushing 38.

EMBODIMENT OF FIG. 6

Adverting now to FIG. 6, there is illustrated another embodiment of the present invention, and indeed an embodiment wherein cocking of the idler gear (14) is prevented, thus keeping the teeth of the idler gear 14 in full engagement with the teeth of the crankshaft-driven gear 12 and the camshaft-driving gear 16. In the embodiment of FIG. 6, the idler gear 14 has a bore 52 of a frustoconical configuration, a sleeve bushing 54 is provided which is of a frustoconical configuration and a stub shaft 56 is provided which has a surface of a frustoconical configuration. Thus, the bore 52 and the shaft 56 have facing surfaces of a frustoconical configuration and the sleeve bushing 54 is of a frustoconical configuration at a bearing surface 58 thereof, which bearing surface 58 is, in the embodiment of FIG. 6, a radially outward facing surface thereof. Further, the aforementioned frustoconically configured surfaces are all generally parallel to one another. It should be noted that it is not necessary that such surfaces be carefully made parallel, since they will wear into such parallel relation with use. It should further be noted that the sleeve bushing 54 may, if desired for ease of construction or for other reasons, be formed of two or more parts which fit together to form the overall bushing 54. Still further, the bushing 54 may be strengthened by providing, for example, a steel backing behind the bearing surface 58.

Means 60 are provided for maintaining an extended area of the bearing surface 58 in fitted mating relation against an extended area of the bore 52 of the idler gear 14 as the bearing surface 58 is worn down. In this embodiment, indeed, substantially the entire bearing surface is kept in fitted mating relation against substantially the entire bore 52. In the particular embodiment of FIG. 6, the maintaining means 60 includes means 62 for biasing the idler gear 14 and the stub shaft 56 axially towards one another. The biasing means 62, as illustrated, comprises a nut 64 sealed by a seal 66 to a stub shaft extension 68, a thrust washer 70 which bears against an out-facing surface 72 of the idler gear 14 and one or more springs, for example bellville washers 74, which act between the nut 64 and the thrust washer 70, pushing the thrust washer 70 relatively rightwardly and thereby propelling the idler gear 14 rightwardly whereby the idler gear 14 and the stub shaft 56 are urged relatively axially towards one another. Since the sleeve bushing 54 is in the bore 52 between the idler gear 14 and the stub shaft 56, it is clear that the sleeve bushing 54 is always in compressed relationship against both the bore 52 and the stub shaft 56.

At least one axially extending groove 76, and if desired a plurality thereof, is provided in the radially outward facing surface 58 of the sleeve bushing 54. Too many grooves 76 should not be used as this can destroy an oil film. The groove 76 continues to a first end 77 thereof at a smaller diameter end of the frustoconical sleeve bushing 54. Means 78 are provided for delivering a pressurized lubricant to the groove or grooves 76. The groove 76 terminates at a second end 79 thereof short of a larger end 81 of the sleeve bushing 54. In the particular embodiment illustrated, the pressurized flowable lubricant delivering means 78 includes an axial bore 80 in the stub shaft 56 which communicates with a radially extending bore 82 therein, which in turn leads to a cavity 84 which communicates with a smaller end 86 of the sleeve bushing 54. The groove or groves 76 likewise communicate with the smaller end 86 of the sleeve bushing 54 and thereby communicate with the cavity 84. In this manner, the radially outward facing surface 58 of the sleeve bushing 54 serves as the bearing surface thereof. An inward-facing surface 88 of the sleeve bushing 54 can be keyed as at 90 to the shaft 56 or can be allowed to rotate relative to the shaft 56. Such rotation will, however, be minor due to the effect of the biasing means 62 and because the lubrication is supplied in the manner just discussed, whereby the primary bearing (sliding) surface will remain the lubricated radially outward facing surface 58.

EMBODIMENT OF FIG. 7

Figure 7:
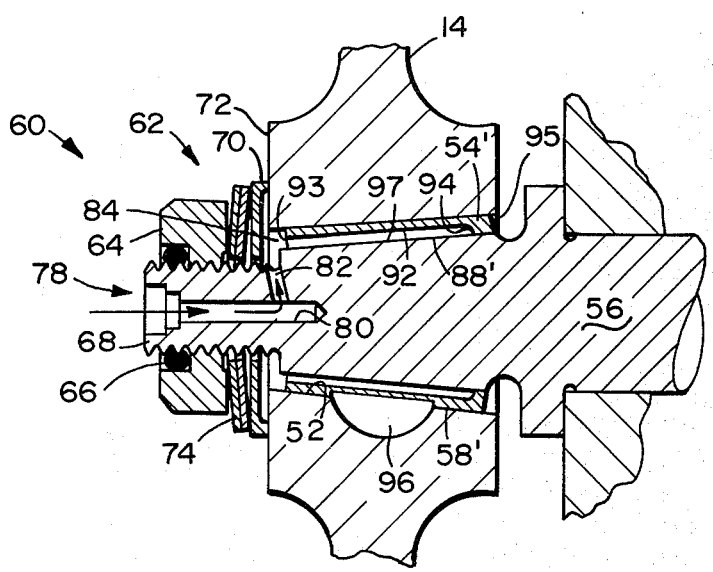
FIG. 7 illustrates, in a view similar to FIG. 2, yet another embodiment in accordance with the present invention.

Adverting now to FIG. 7, there is illustrated an embodiment which is very similar to that of FIG. 6 but wherein there are not any axially extending grooves 76 in the radially outward facing surface 58 of the sleeve bushing 54'. Instead, there is at least one axially extending groove 92, and more preferably a plurality of such grooves, in the radially inward-facing surface 88' of the sleeve bushing 54'. In this situation, each of the grooves 92 extends at a first end 93 thereof to the cavity 84 thus assuring lubrication of the inward-facing surface 88' of the sleeve bushing 54'. The groove 92 ends at a second end 94 thereof short of a larger end 95 of the sleeve bushing 54'. The radially inward-facing surface 88' thereby serves as the primary bearing surface and bears against an extended area, namely, an outer surface 97, of the shaft 56. If desired, the radially outward facing surface 58' can be keyed to the bore 52, as for example as illustrated at 96. Once again, such keying is not necessary, since, due to the axial compressing provided by the biasing means 62, the sleeve bushing 54' will always be compressed between the bore 52 and the shaft 56 to provide structural integrity and with inadequate lubrication it will not slip on its outer surface.

INDUSTRIAL APPLICABILITY

The invention functions to assure the maintenance of an extended area of a bearing surface in fitted mating relation against an extended area of either a shaft or a bore, as the bearing surface is being worn down. In particular, the invention is concerned with the situation wherein an idler gear is mounted to a stationary shaft. In accordance with the present invention an extended area of a bearing surface upon which the relatively rotating one of the idler gear and the shaft rotates is maintained in fitted or mating relation as the bearing surface is worn down. Edge loading wherein substantially all of the forces between the idler gear and the shaft are exerted at the edges of the gear, is substantially prevented by an improvement in accordance with the present invention. When the embodiments of either of FIGS. 6 or 7 is utilized, cocking of the idler gear relative to the stub shaft upon which it is mounted is eliminated as well.

Other aspects, objectives, and advantages of this invention can be obtained from the study of the drawings, the disclosure and the appended claims.

I claim:
1. In a bearing arrangement wherein a rotary member (14) is rotatably mounted at a bore (26, 52) therein on a relatively stationary shaft (30, 56), said arrangement having means for biasing said member to tilt about an axis perpendicular to said shaft, the improvement comprising:
   a sleeve bushing (38, 54, 54') having an axially extending bearing surface (42, 58, 88'), said sleeve bushing being located between said bore (26, 52) and in rotating relation to at least one of said bore (26, 52) and said shaft (30, 56), said sleeve bushing (38, 54, 54') having means (51, 60) for maintaining a laterally extending area of said bearing surface (42, 58, 88') in fitted mating relation against an axially and laterally extending area (49, 52, 97) of a respective one of said shaft (30, 56) and said bore (26, 52) as said bearing surface (42, 58, 88') wears.

2. The improvement as in claim 1, wherein said maintaining means (51) includes means (40) for attaching said sleeve bushing (38) about said shaft (30) in non-rotating relation thereto and within said bore (26) in rotating relation thereto, said bearing surface (42) is a radially outward facing surface (42) of said sleeve bushing (38) and said bearing surface (42) is of a more easily wearable material than said bore (26).

3. The improvement as in claim 1, wherein said bore (52) and said shaft (56) have facing surfaces (52, 97) of a frustoconical configuration, said sleeve bushing (54, 54') is of a frustoconical configuration at said bearing surface (58, 88') thereof, said bearing surface (58, 88') is one or both of a radially inward facing surface (88') of said sleeve bushing (54, 54') and a radially outward facing surface (58) thereof, and said frustoconically configured surfaces are all generally parallel to each other, and wherein said maintaining means (60) includes means (62) for relatively biasing said rotary member (14) and said shaft (56) axially towards one another.

4. The improvement as in claim 3, including:
   at least one axially extending groove (76, 92) in a respective one of said radially inward (88') and radially outward (58) facing surfaces, said resepctive one surface serving as said bearing surface (58, 88'); and means (78) for delivering a pressurized flowable lubricant to said groove (76, 92).

5. The improvement as in claim 3, wherein said sleeve bushing (54, 54') is attached to said shaft (56), and including:

at least one axially extending groove (76) in said radially outward facing surface (58) of said sleeve bushing (54), said outward facing surface (58) serving as said bearing surface (58); and means (78) for delivering a pressurized flowable lubricant to said groove (76).

6. The improvement as in claim 3, wherein said sleeve bushing (54, 54') is attached to said bore (52), and including:

at least one axially extending groove (92) in said radially inward facing surface (88') of said sleeve bushing (54'), said radially inward facing surface (88) serving as said bearing surface (88); and means (78) for delivering a pressurized flowable lubricant to said groove (92).

7. The improvement as in claim 3, including:

at least one axially extending groove (76, 92) in said bearing surface (58, 88') of said sleeve bushing (54, 54'); and means (78) delivering a pressurized flowable lubricant to said groove (76, 92).

8. The improvement as in claim 1, wherein said rotary member (14) is a helical idler gear and said shaft (30, 56) is a stub shaft.

9. In a bearing arrangement wherein a rotary member (14) is rotatably mounted at a bore (26, 52) therein on a relatively stationary shaft (30, 56), said arrangement having means for biasing said member (14) to tilt about an axis perpendicular to said shaft (30, 56), the improvement comprising:

a sleeve bushing (54, 54') having a axially extending bearing surface (58, 88'), said sleeve bushing (54, 54') being located between said bore (52) and in rotating relation to at least one of said bore (52) and said shaft (56), said sleeve bushing (54, 54') having means (60) for maintaining a laterally extending area of said bearing surface (58, 88') in fitting mating relation against an axially and laterally extending are a (52, 97) of a respective one of said shaft (56) and said bore (52) as said bearing surface (58, 88'), wears, said maintaining means (60) including means (62) for relatively biasing said rotary member (14) and said shaft (56) axially towards one another;

wherein said bore (52) and said shaft (56) have facing surfaces (52, 97) of a frustoconical configuration, said sleeve bushing (54, 54') is of a frustoconical configuration at said bearing surface (58, 88') thereof said bearing surface (58, 88') is one or both of a radially is one or both of a radially inward facing surface (88') of said sleeve bushing (54, 54') and a radially outward facing surface (58) thereof, and said frustoconically configured surfaces are all generally parallel to each other;

at least one axially extending groove (76), 92) in said bearing surface (58, 88') of said sleeve bushing (54, 54'); and means (78) delivering a pressurized flowable lubricant to said groove (76, 92), said delivering means (78) including an annular cavity (84) formed by a smaller end (86) of said sleeve bushing (54, 54'), said shaft (56), and said bore (58) and a passage (80, 82) leading to said cavity (84) and wherein a first end (77, 93) of the groove (76, 92) is in flow communication with the cavity (84) and a second end (79, 94) of said groove (76, 92) terminates adjacent but short of a larger end (81, 95) of the sleeve bushing (54).

* * * * *